United States Patent [19]
Fowler et al.

[11] 3,826,350
[45] July 30, 1974

[54] PADDLE-TYPE CONVEYOR

[75] Inventors: Gene Roger Fowler; Sidney Elmer Anderson, both of Geneseo, Ill.

[73] Assignee: Deer & Company, Moline, Ill.

[22] Filed: Apr. 2, 1973

[21] Appl. No.: 347,059

[52] U.S. Cl............... 198/82, 198/212, 56/12.4, 56/12.5
[51] Int. Cl............................... B65g 37/00
[58] Field of Search ........... 198/211, 212, 160, 167, 198/25, 82, 104, 105; 56/13.3, 12.4, 12.5, 33

[56] References Cited
UNITED STATES PATENTS

| | | | |
|---|---|---|---|
| 2,533,510 | 12/1950 | Roscoe | 56/33 |
| 2,831,565 | 4/1958 | Hensley | 198/82 |
| 3,126,688 | 3/1964 | Karlsson | 56/13.3 |

*Primary Examiner*—Richard A. Schacher
*Assistant Examiner*—Joseph E. Valenza

[57] ABSTRACT

A combine has a forward harvesting header, a separating mechanism in the combine body, and a fore-and-aft upwardly and rearwardly inclined feeder housing between the header and the combine body for delivering the harvested crop to the separating mechanism. The feeder housing has an upwardly and rearwardly inclined floor and opposite upright sidewalls, and a plurality of rotary, axially transverse, paddle-type impellers extend between the sidewalls with their peripheries proximate to the floor and to one another, so that as the impellers rotate the crop is engaged by successive impellers and moved upwardly and rearwardly along the floor. Each impeller is formed by an axial shaft and a pair of flexible, radial paddles attached to the shaft, each paddle being formed by a pair of tire carcass members spanning the width of the feeder housing and having a curvature about a transverse axis parallel to the shaft, the tire carcass members being attached to the shaft with their concave sides facing each other and with their outer edges at the periphery of the impeller.

4 Claims, 3 Drawing Figures

3,826,350

PADDLE-TYPE CONVEYOR

BACKGROUND OF THE INVENTION

The invention relates to a crop-handling device for a combine or the like, and more particularly to an improved paddle-type conveyor for moving crop material from a harvesting header to a crop-treating mechanism in a combine or the like.

Although most commercially available combines utilize a chain-and-slat-type conveyor in the combine feeder housing for moving crop material from the harvesting header to the separating mechanism in the combine body, it is known to utilize a conveyor system that includes a number of paddle-type impellers in the feeder housing wherein successive impellers engage the crop and move it rearwardly along the floor of the feeder housing. It is further known to utilize flexible paddles made of rubber or the like in such paddle-type conveyors, such rubber paddles being utilized in the feeder housing for a corn-harvesting attachment previously marketed by Deere & Company, the assignee of the present application.

However, the rubber paddles tend to take a permanent set from constant flexing in one direction, curving away from the direction of rotation. Also, old tire carcasses provide a very economical material for the manufacture of such flexible paddles and have been used therein, although the tire carcass paddles have a natural curvature and take on the above-described permanent set to a substantial degree. As is apparent, once the paddle becomes curved, the effective diameter of the impeller is decreased so that it loses its effectiveness for conveying straw along the floor of the feeder housing, although it will still convey larger materials such as ears of corn. To eliminate the curvature, it is known to mount the flexible paddles on the shaft by means of a generally radially extending angle iron or the like with one leg of the angle iron parallel to the flexible paddle, the outer edge of the iron being disposed relatively closely to the outer periphery of the impeller to limit the flexing of the paddle and eliminate the above-described curvature. While this has eliminated the curvature and the problem associated with feeding small grains, when utilized in corn, the small clearance between the angle iron support and the feeder housing floor creates large stresses when an ear of corn becomes wedged between the feeder housing floor and the rigid angle iron.

SUMMARY OF THE INVENTION

According to the present invention, improved rubber flexible paddles are provided that will resist a permanent set in the direction opposite the direction of rotation but will also permit sufficient flexing so that unduly high stresses are not encountered when an ear of corn is wedged between the paddle and the feeder housing floor. More specifically, each paddle is made of a pair of flexible elements that have natural curvatures, the concave side of the paddle elements being positioned facing one another so that the natural curvature of the rear paddle element offsets the curvature of the first, whereby the outer edges of the two paddle elements are maintained at the original periphery of the paddle-type impeller close to the feeder housing floor while still maintaining sufficient flexibility to prevent damage when conveying ear corn or the like.

An important feature of the invention resides in the fact that the paddle elements can be made of tire carcasses and have natural curvatures, the concave side of the elements being placed facing one another, the tire carcasses providing a durable and inexpensive supply for the paddle elements.

DESCRIPTION OF THE PREFERRED EMBODIMENT

Figure 1:
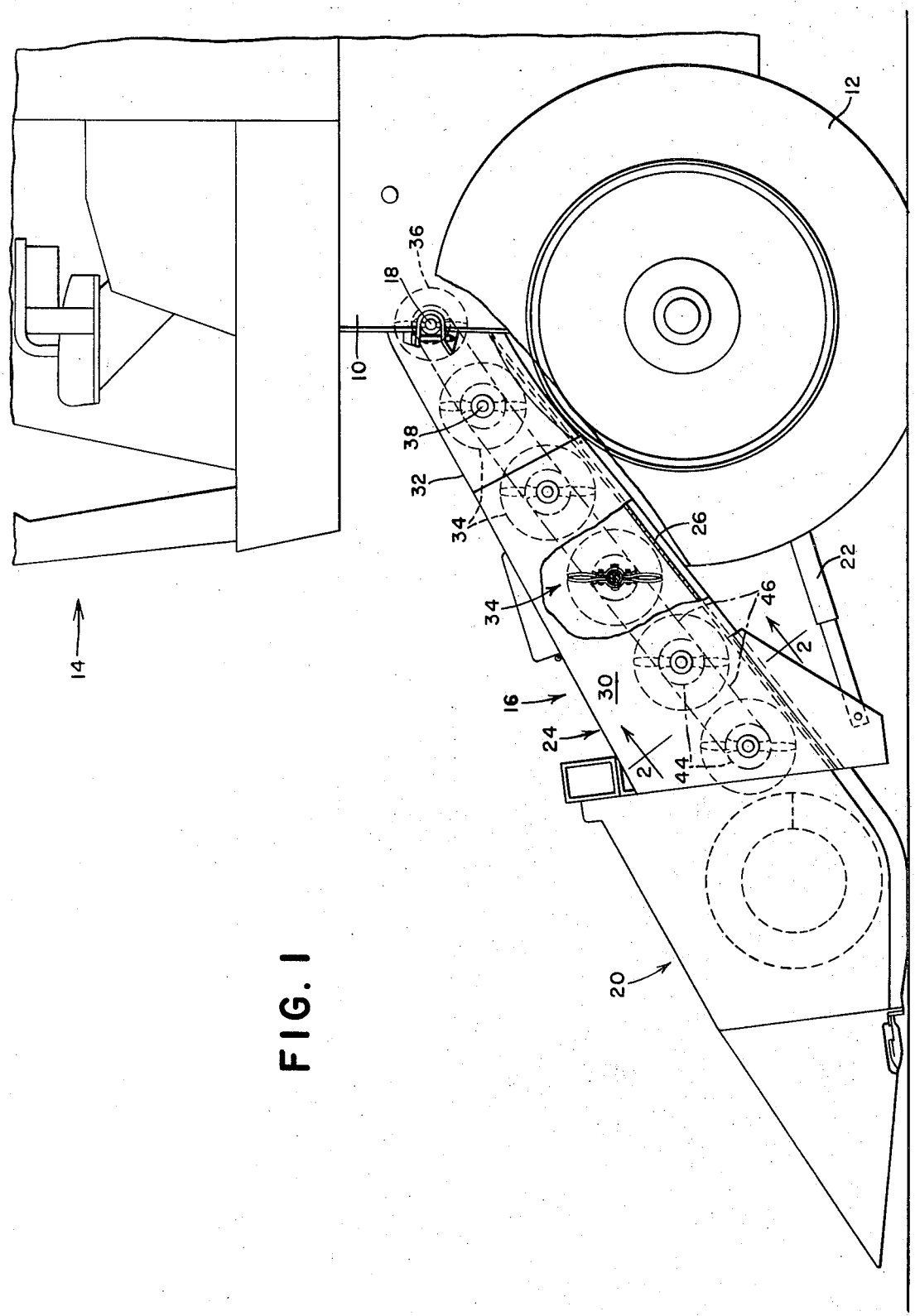
FIG. 1 is a side elevation view of the forward portion of a combine with a portion of the wheel broken away to show the feeder housing conveyor system and a portion of the feeder housing being broken away to show one of the paddles in full.

The invention is embodied in a self-propelled combine having a main separator body 10 mounted on a pair of forward drive wheels 12 and having a forward elevated operator's station 14, only the forward portion of the combine body being shown in FIG. 1. As is well known, the body has a forward crop inlet and a crop-separating and cleaning mechanism within the body. A forwardly and downwardly inclined crop-conveying mechanism or feeder house 16 is mounted for vertical adjustment on a transverse pivot 18 at the forward end of the body, the rearward discharge end of the conveying mechanism communicating with the crop inlet in the body. A harvesting header 20, here shown as a grain platform, is mounted on the forward end of the crop-conveying mechanism 16 and is vertically adjustable therewith by means of a cylinder 22 extending between the combine body 10 and the forward end of the conveyor mechanism 16. As is well known, the header 20 removes the crop from the field as the machine advances, converges the crop, and delivers it through a discharge opening in the rear wall of the header, which communicates with the forward crop inlet of the crop-conveying mechanism 16.

The crop-conveying mechanism 16 includes a housing 24 having an upwardly and rearwardly inclined floor 26, extending between opposite upright sidewalls 28 and 30, and a top wall 32 generally parallel to and above the floor 26. Six rotary, axially transverse, paddle-type conveyor impellers 34 are mounted side-by-side within the housing 24 and span the distance between the sidewalls 28 and 30, the outer periphery of each impeller being rotated closely adjacent to the floor and to the adjacent impeller. The front five impellers are identical, while the rearward impeller, which is identified by the numeral 36, is somewhat smaller in diameter and is mounted coaxially with the pivot 18 so that it is disposed in the crop inlet of the body 10. The front impeller is located adjacent the forward end of the feeder housing and extends through the discharge opening in the rearward wall of the harvesting header 20, so that the crop moving through the header discharge opening is engaged by the front impeller and is moved upwardly and rearwardly along the floor by succeeding impellers.

Each impeller includes an axial shaft 38 having its opposite ends journaled in bearings 40 and 42 respectively mounted in the sidewalls 28 and 30. The impellers are all driven in a counterclockwise direction as viewed in FIG. 1 by a drive adjacent the right sidewall 28, the entire drive being shown in hidden lines in FIG. 1. The drive includes a pair of sheaves 44 mounted on adjacent shafts 38 and drivingly connected by a belt 46, so that each shaft is rotated from the rearwardly adjacent shaft, the rearwardmost shaft being coaxial with the pivot 18 and driven by a drive system on the combine body in a well known manner.

Figure 3:
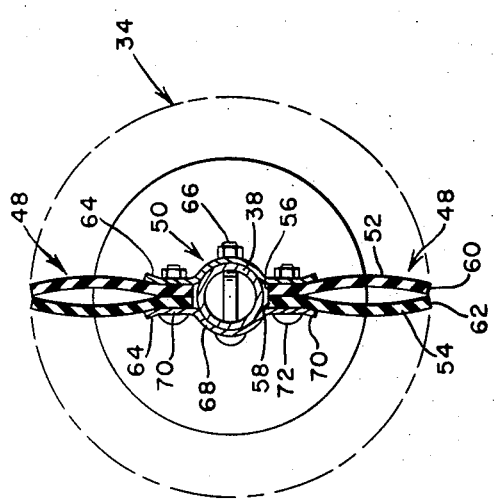
FIG. 3 is a vertical section through one of the conveyor impellers as viewed along the line 3—3 of FIG. 2.

Each impeller includes a pair of radial paddles 48, which extend longitudinally across the width of the conveyor mechanism 16 and are attached to the impeller shaft 38 by an attaching means indicated in its entirety by the numeral 50. As best seen in FIG. 3, each paddle 48 is formed by a pair of opposite and adjacent flexible paddle elements 52 and 54 respectively having inner ends or edges 56 and 58 abutting the shaft 38 and outer edges 60 and 62 at the impeller periphery, the outer edges defining a cylinder as the impeller rotates. Preferably the paddle elements are made of tire carcasses that have a natural bow or curvature, the axis of curvature being parallel to the shaft and the paddle elements being arranged so that the concave sides of the paddle elements face one another.

The attaching means 50 includes a pair of similar opposite clamp members 64 affixed to opposite sides of the shaft 38 by a plurality of bolt and nut-type fasteners 66 extending through apertures in the clamp member and diametrally through the impeller shaft. As is apparent from FIG. 2, the clamp members extend the width of the impellers co-extensively with the paddle elements and the fasteners are located at intervals along the length of the clamp members. Each clamp member 64 has an arcuate center portion conforming with the periphery of the shaft and approximately radial extensions 70 extending in opposite directions from the center portion 68, the extensions 70 being spaced a short distance from the extensions on the opposite clamp member. The inner ends of the paddle members are inserted between the opposite extensions 70 and clamped therebetween by a plurality of nut and bolt-type fasteners 72 extending through holes in the extensions and in the paddle elements, the fasteners 72, like the fasteners 66, being spaced at intervals along the entire length of the impeller.

Figure 2:
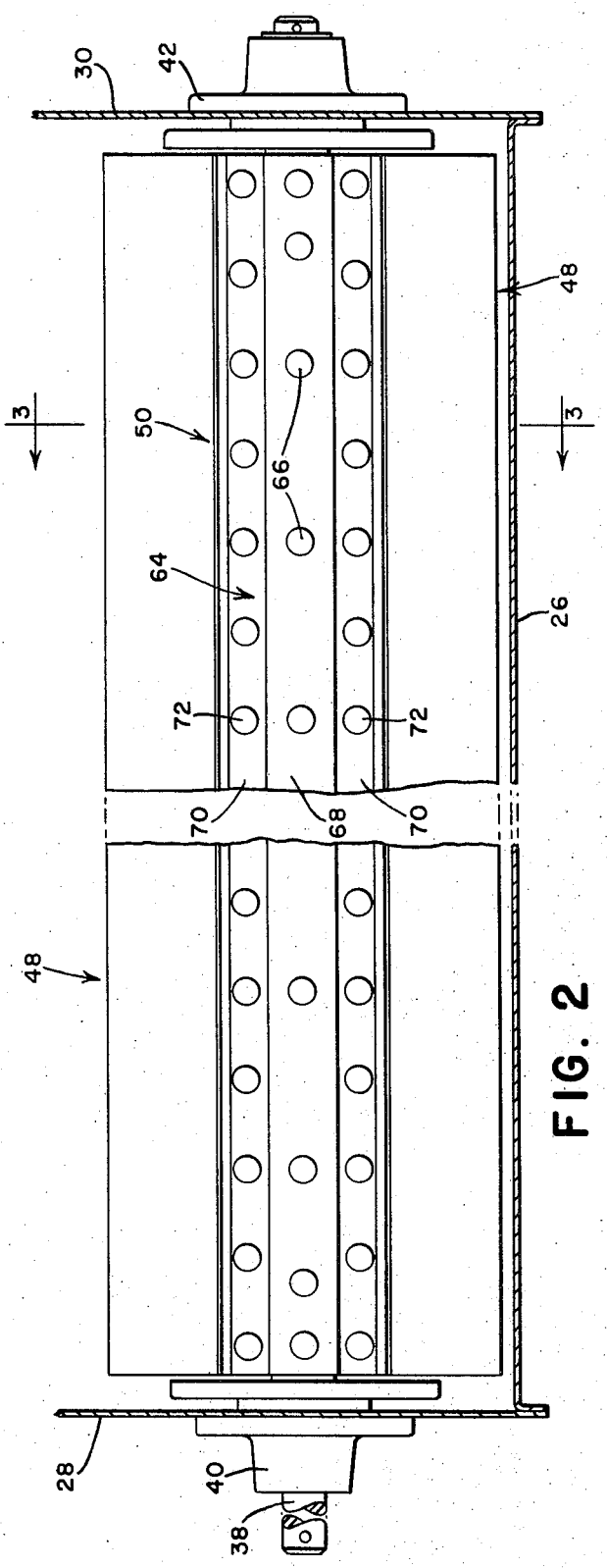
FIG. 2 is an enlarged, partial, vertical transverse section through the feeder housing along the line 2—2 of FIG. 1.

In operation, as previously described, the harvesting header 20 delivers the crop to the forward conveyor impeller 34, which is rotated in a counterclockwise direction as viewed in FIG. 2 and moves the material along the floor 26 to the next impeller, which also rotates in a counterclockwise direction and delivers the material along the floor to the succeeding impeller, the crop material being engaged by succeeding impellers until it is discharged through the rearward end of the crop-conveying mechanism 16 by the rear impeller 36.

Since the paddle element 52 is on the advanced side of the paddle in FIG. 2, it tends to bow in the direction of its normal curvature. However, the bowing tendency of the paddle element 52 is resisted by the opposite paddle element 54, which prevents the paddle element 52 from taking a permanent set that would decrease the effective diameter of the impeller. Although the second paddle element 54 resists the permanent set of the opposite paddle element, it is sufficiently flexible that it will give when an ear of corn or the like becomes wedged between the impeller and the floor so that the conveying mechanism is not overstressed.

We claim:

1. In a harvesting machine having harvesting means for removing a crop from the field and a crop-treating mechanism, the combination therewith of improved means for conveying the crop from the harvesting means to the crop-treating mechanism comprising: a feeder housing having a floor extending between opposite, generally upright sidewalls, a forward crop inlet adapted to receive the crop from the harvesting means and a rearward discharge; a plurality of rotary, axially transverse paddle-type impellers mounted adjacently parallel in the housing between the sidewalls, each impeller including an axial shaft, a plurality of longitudinally extending flexible paddles, and means for attaching the paddles to the shaft, so that they extend in a generally radial direction, each paddle being formed by a pair of adjacent longitudinal members at least partly made of elastomeric material and having a curvature about the longitudinal axis, the members being mounted with their concave sides opposite one another and with their outer longitudinal edges abutting each other at the impeller periphery, the impeller being so located and rotated that the outer edges of the paddle members swing rearwardly above and proximate to the floor, whereby successive impellers engage the crop and move it rearwardly along the floor.

2. The invention defined in claim 1 wherein the paddle elements are made of tire carcasses.

3. An improved conveyor for moving crop material or the like comprising: a housing including a floor and opposite upright sidewalls; a plurality of rotary paddle-type impellers mounted parallel and adjacent to one another in close proximity to the floor and extending between the opposite sidewalls for moving the crop material along the floor in response to rotation of the impellers in the same direction, each impeller including an axial shaft and a plurality of generally radial paddles attached to the shaft and extending longitudinally thereof, each paddle including a pair of opposite elastomeric paddle members having a curvature about a longitudinal axis parallel to the shaft and mounted with their concave side facing one another and the outer edges abutting each other at the impeller periphery.

4. The invention defined in claim 3 wherein the paddle members are made of tire carcasses.

* * * * *